(12) United States Patent
Ayala

(10) Patent No.: US 10,500,591 B2
(45) Date of Patent: Dec. 10, 2019

(54) SYSTEM AND METHOD FOR THE PREPARATION OF A FEEDSTOCK

(71) Applicant: Air Products and Chemicals, Inc., Allentown, PA (US)

(72) Inventor: Raúl Eduardo Ayala, Sugar Land, TX (US)

(73) Assignee: Air Products and Chemicals, Inc., Allentown, PA (US)

( * ) Notice: Subject to any disclaimer, the term of this patent is extended or adjusted under 35 U.S.C. 154(b) by 1010 days.

(21) Appl. No.: 14/843,794

(22) Filed: Sep. 2, 2015

(65) Prior Publication Data

US 2017/0058218 A1 Mar. 2, 2017

(51) Int. Cl.
*B02C 17/16* (2006.01)
*C10J 3/48* (2006.01)
*C10J 3/50* (2006.01)
*C10J 3/72* (2006.01)
*B02C 17/18* (2006.01)

(52) U.S. Cl.
CPC .............. *B02C 17/16* (2013.01); *B02C 17/18* (2013.01); *C10J 3/50* (2013.01); *C10J 3/721* (2013.01); *C10J 3/723* (2013.01); *C10J 2200/15* (2013.01); *C10J 2300/0906* (2013.01); *Y02E 20/16* (2013.01); *Y02E 20/18* (2013.01)

(58) Field of Classification Search
CPC . B02C 17/1835; B02C 17/183; B02C 17/002; B02C 17/04; B02C 17/06; B02C 17/10; B02C 17/16; B02C 17/163; B02C 17/18; B02C 17/182; B02C 17/184; B02C 17/185; B02C 17/1855; B02C 9/00; B02C 9/02; B02C 9/04; B02C 2013/145; B02C 2013/28609; B02C 13/14; B02C 13/16; B02C 13/18; B02C 13/26; B02C 13/28; B02C 2017/165; B02C 23/24; B02C 23/28; B02C 19/005; B02C 19/0012; B02C 19/0018; B02C 19/004; C10J 2300/1693; C10J 2300/0906; C10J 2300/0903
USPC ................ 241/170–173, 152.1, 153, 154
See application file for complete search history.

(56) References Cited

U.S. PATENT DOCUMENTS

| | | |
|---|---|---|
| 3,652,021 A | 3/1972 | Engels |
| 3,653,600 A | 4/1972 | Schold |
| 3,672,580 A | 6/1972 | Nye |
| 3,817,461 A | 6/1974 | Geissel et al. |
| 3,920,191 A | 11/1975 | Bradley |
| 3,951,849 A | 4/1976 | Vickery et al. |
| 3,998,938 A | 12/1976 | Szegvari |

(Continued)

FOREIGN PATENT DOCUMENTS

| | | |
|---|---|---|
| EP | 0391915 A | 10/1990 |
| EP | 0686428 A1 | 12/1995 |

(Continued)

*Primary Examiner* — Shelley M Self
*Assistant Examiner* — Katie L. Parr
(74) *Attorney, Agent, or Firm* — Amy Carr-Trexler

(57) ABSTRACT

Disclosed embodiments include a feedstock preparation system that includes a solid feedstock mill including a housing having a chamber. The solid feedstock mill also includes a solids breakup assembly at least partially disposed inside the chamber. The solid feedstock mill further includes a feedstock inlet through the housing into the chamber and a plurality of feedstock outlets through the housing from the chamber.

20 Claims, 4 Drawing Sheets

(56) References Cited

U.S. PATENT DOCUMENTS

| | | | |
|---|---|---|---|
| 4,174,074 A * | 11/1979 | Geiger | B02C 17/16 241/172 |
| 4,175,117 A | 11/1979 | Hill | |
| 4,225,092 A | 9/1980 | Matter et al. | |
| 4,244,531 A | 1/1981 | Szegvari | |
| 4,582,266 A | 4/1986 | Entrikin et al. | |
| 4,746,069 A | 5/1988 | Entrikin et al. | |
| 4,749,133 A * | 6/1988 | Sayler | B02C 23/28 110/106 |
| 4,844,355 A | 7/1989 | Kemp, Jr. et al. | |
| 4,850,541 A | 7/1989 | Hagy | |
| 5,312,055 A * | 5/1994 | Barthelmess | B02C 17/16 241/172 |
| 5,732,894 A * | 3/1998 | Sheahan | B02C 13/18 241/154 |
| 7,073,738 B2 | 7/2006 | Sneeringer et al. | |
| 7,374,116 B2 | 5/2008 | Ishikawa et al. | |
| 7,931,222 B2 | 4/2011 | Stehr et al. | |
| 8,202,399 B2 * | 6/2012 | Taylor | C10L 1/322 201/21 |
| 8,267,337 B2 * | 9/2012 | Webb | B02C 13/18 241/27 |
| 8,893,992 B2 * | 11/2014 | Mitchell | B02C 19/18 241/1 |
| 2002/0003179 A1 * | 1/2002 | Verhoff | A61K 9/14 241/21 |
| 2009/0188998 A1 * | 7/2009 | Anderson | B02C 17/16 241/22 |
| 2009/0206186 A1 * | 8/2009 | Morrison | B01D 21/06 241/24.16 |
| 2014/0103153 A1 * | 4/2014 | Below | B02C 4/286 241/100 |
| 2014/0202068 A1 | 7/2014 | Depuy et al. | |
| 2014/0208637 A1 | 7/2014 | Bi et al. | |
| 2014/0208649 A1 | 7/2014 | Ayala et al. | |
| 2015/0175912 A1 * | 6/2015 | Koenig | B02C 23/02 241/101.5 |
| 2015/0217301 A1 * | 8/2015 | La Froscia | D21B 1/06 435/160 |

FOREIGN PATENT DOCUMENTS

| | | |
|---|---|---|
| WO | 8000925 | 5/1980 |
| WO | 8901825 | 3/1989 |

* cited by examiner

SYSTEM AND METHOD FOR THE PREPARATION OF A FEEDSTOCK

BACKGROUND OF THE INVENTION

The subject matter disclosed herein relates to milling systems for preparing a feedstock.

Synthesis gas or "syngas" is a mixture of carbon monoxide (CO) and hydrogen ($H_2$) and other components present in lesser degrees, such as carbon dioxide ($CO_2$). Syngas has a number of uses, such as in power generation, steam generation, heat generation, substitute natural gas (SNG) production, as well as chemical synthesis. Syngas can be produced using gasification processes, which utilize a solid, liquid, and/or gaseous carbonaceous fuel source such as coal, coke, oil, and/or biomass, to react with oxygen ($O_2$) to produce the syngas within a gasifier. While certain carbonaceous fuels may be provided to the gasifier directly, solid carbonaceous fuel sources are often provided to the gasifier as a fuel slurry, where the solid fuel is dispersed within a liquid, such as water. The liquid may be used to facilitate flow of the solid fuel into the gasifier as well as to facilitate dispersal of the solid fuel within the gasifier, for example to increase gasification efficiency. Unfortunately, the presence of liquid in the slurry may reduce the energy content of syngas produced per unit weight of feed as compared with other more concentrated fuel sources, such as liquid, solids, or gaseous feeds. Thus, it is desirable to attain high solids concentration and be compatible with the operating range of the plant equipment.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the invention. Indeed, the present disclosure may encompass a variety of forms that may be similar to or different from the embodiments set forth below.

In a first embodiment, a system includes a solid feedstock mill that may include a housing having a chamber. The solid feedstock mill may also include a solids breakup assembly at least partially disposed inside the chamber. Additionally, the solid feedstock mill may include a feedstock inlet through the housing into the chamber. The solid feedstock mill may further include a plurality of feedstock outlets through the housing from the chamber.

In a second embodiment, a system includes a solid feedstock mill including a housing having a chamber. The solid feedstock mill may also include a solids breakup assembly that may include a plurality of balls disposed inside the chamber, a drive coupled to a rod that extends into the chamber, and a plurality of radial structures coupled to the rod. Additionally, the solid feedstock mill may include a feedstock inlet through the housing into the chamber and a plurality of feedstock outlets through the housing from the chamber. The plurality of feedstock outlets may be non-circular.

In a third embodiment, a method may include receiving a feedstock through a feedstock inlet into a chamber of a housing of a solid feedstock mill. The method may also include breaking up the feedstock with a solids breakup assembly at least partially disposed inside the chamber. Further, the method may include outputting the feedstock from the chamber through a plurality of feedstock outlets in the housing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
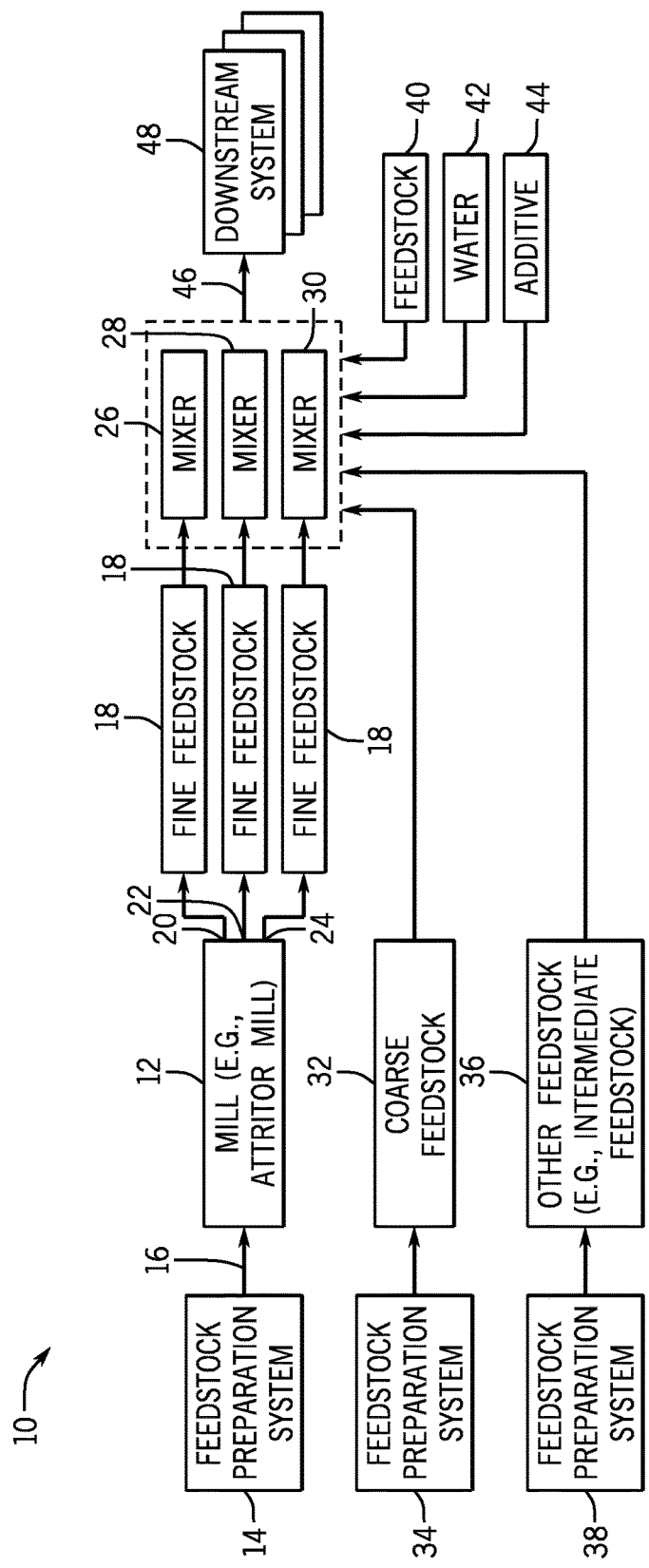
FIG. 1 is a block diagram of an embodiment of a system for producing a feedstock with a desired solids concentration.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

There is an interest in the gasification of low rank coal due to its reduced cost and relative availability, compared to other coals such as bituminous or anthracite coals. However, low rank coal may contain 30% by weight of water or higher, making processing and gasification inefficient due to lower energy content. For example, during gasification, the excess water within low rank coals may be removed (e.g., evaporated), which consumes energy and reduces efficiency. The low rank coals may include, but are not limited to, sub-bituminous coals, lignite coals, or a combination thereof. In order to improve the gasification efficiency of coal slurries (e.g., low rank coal slurries), higher concentrations of coal in the slurry may be desirable. However, concentrated slurries may be highly viscous, which may be difficult to discharge from mills and to transport from the mills to other components, such as tanks, mixers, etc, and may cause wear to various components transporting the viscous slurry, such as piping, pumps, etc.

Accordingly, the present embodiments provide systems and methods for preparing feedstocks (e.g., slurries) for gasification having a desired concentration of a solid fuel, such as coal or petroleum coke (petcoke). In certain embodiments, a system may be configured to prepare concentrated coal feedstocks using fine particles of coal. For example, the system may mix a first feedstock with a first particle size distribution, such as a coarse feedstock or an intermediate sized feedstock, with a second feedstock with a second particle size distribution, such as a fine feedstock. For example, in some embodiments, relative to a baseline size of feedstock particles (B), the intermediate sized particles (I) may be equal to I/B=0.5 to 1.5, the fine particles (F) may be equal to F/B=0.01 to 0.5, and the coarse particles (C) may be equal to C/B=1.5 to 5. In some embodiments, the coarse particles may be approximately 1.5, 2, 3, 4, 5, 6, 7, 8, 9, 10, or more times larger than the intermediate sized particles and/or the fine particles, while the fine particles may be approximately 0.05, 0.1, 0.2, 0.3, 0.4, or 0.5 of the intermediate sized particles. By mixing the first feedstock with the second, fine feedstock, the resulting feedstock may have a higher concentration of solid fuel with a lower viscosity as compared to a feedstock produced using only the first feedstock. Thus, the system may improve gasification efficiencies and reduce wear on various components of the system by providing concentrated feedstocks with a viscosity under a predetermined threshold.

Additionally, the present embodiments provide a system including a mill, such as a solid feedstock mill or an attritor mill, which includes a plurality of outlets for discharging a feedstock. The cross-sectional area for discharging the feedstock may be greater in the mill including the plurality of outlets as compared to a mill including a single outlet. The increased cross-sectional area may enable higher volumes of the feedstock to be discharged from the mill and, in particular, may enable a faster discharge rate of highly viscous feedstocks. Further, the plurality of outlets may increase the versatility of the system. For example, the feedstock discharged from each outlet of the plurality of outlets may be directed to a different component of the system. As such, the feedstock from the mill may be transported to a plurality of mixers (e.g., for mixing with additional feedstocks of different concentrations, additives, water, etc.), a plurality of tanks, a plurality of gasifiers, or any combination thereof.

Turning now to the drawings, FIG. 1 illustrates a diagram of an embodiment of a system 10 including a mill 12 configured to output a plurality of feedstock streams. Specifically, the system includes a first feedstock preparation system 14, which may provide a first feedstock 16 to the mill 12. It should be appreciated that the first feedstock preparation system 14 may receive at least a solid feedstock to produce the first feedstock 16. That is, as used herein, the term feedstock may refer to a dry feedstock including only solids or a wet feedstock (e.g., a slurry) including both solids and liquids. In embodiments in which the system 10 is a gasification system, the first feedstock preparation system 14 may receive a solid fuel, which may include a variety of carbonaceous fuels, such as coal, biomass, petroleum coke, any other carbonaceous fuel, or a combination thereof. In some embodiments, the solid fuel may be sub-bituminous (low rank) coal, which contains a certain amount of inherent liquid (e.g., water). However, it should be appreciated that the system 10 may be suitable for other systems including mills, such as, but not limited to, food production systems (e.g., chocolate production systems), chemical processing systems, metal processing systems, or mineral processing systems. Accordingly, the first feedstock preparation system 14 may receive any suitable solid feedstock, such as, but not limited to, cocoa, chemicals, metals, or minerals. Additionally, the first feedstock preparation system 14 may include a crusher, a grinder, a mill, a mixer, and/or any other suitable unit to generate the first feedstock 16.

Once the first feedstock has been prepared, the first feedstock 16 may be transported to the mill 12. The mill 12 may be an attritor mill, a colloid mill, a ball mill, a ball and tube mill, or any other suitable mill. The mill 12 may break up (e.g., grind, pulverize, etc.) the first feedstock 16 into fine particles to produce a fine feedstock 18. In particular, the first feedstock 16 may have a first particle size and the fine feedstock 18 may have a second particle size that is smaller than the first particle size. For example, the solid feedstock in the fine feedstock 18 may have an average particle size of between 10% and 500% smaller than the average particle size of the solid feedstock in the first feedstock 16. In certain embodiments, the fine feedstock 18 may have fine particles of the solid feedstock with an average particle size of between 20% and 400%, 30% and 300%, 40% and 200%, and/or 50% and 100% smaller than the particles of the solid feedstock in the first feedstock 16. In some embodiments, the fine feedstock 18 may have fine particles of the solid feedstock with an average particle size that is 0.01 to 0.9, 0.05 to 0.8, 0.1 to 0.7, 0.2 to 0.6, or 0.3 to 0.5 of the average particle size of the solid feedstock in the first feedstock 16.

The mill 12 includes at least two outlets for the fine feedstock 18. For example, in the illustrated embodiment, the mill 12 includes a first outlet 20, a second outlet 22, and a third outlet 24. However, it should be appreciated that the mill 12 may include any suitable number of outlets (e.g., 2, 3, 4, 5, 6, 7, 8, 9, 10, or more). The outlets 20, 22, and 24 may increase the versatility of the system 10. In particular, outlets 20, 22, and 24 may enable delivery of the fine feedstock 18 to different components of the system 10, such as mixers, tanks (e.g., storage tanks, holding tanks, buffer tanks, etc.), gasifiers, mills, feedstock preparation systems, or any combination thereof. Additionally, the fine feedstock 18 from each outlet 20, 22, and 24 may be delivered to components of different types or components of the same type. In some embodiments, the fine feedstock 18 from each outlet 20, 22, and 24 may be used for the same or different purposes.

In certain embodiments, the system 10 may include a plurality of mixers, such as a first mixer 26, a second mixer 28, and a third mixer 30, downstream of the mill 12. For example, the fine feedstock 18 from the first outlet 20 may be delivered to the first mixer 26, the fine feedstock 18 from the second outlet 22 may be delivered to the second mixer 28, and the fine feedstock 18 from the third outlet 24 may be delivered to the third mixer 30. It should be appreciated that each of the outlets 20, 22, and 24 may be coupled to a respective conduit (e.g., piping) for delivering the fine feedstock 18. Additionally, each conduit may include one or more valves, metering devices, and/or one or more pumps to provide independent measurement or control of the flow of fine feedstock 18 in the respective conduit.

By providing the fine feedstock 18 to the mixers 26, 28, and 30, the fine feedstock 18 may be mixed with one or more materials to produce feedstocks with different compositions (e.g., different percentages of feedstock, different percentages of water, different percentages of additives, different distribution of sizes of feedstock particles, different solids concentrations, different viscosities, or a combination thereof). For example, the first mixer 26 may output a first mixed feedstock with a first composition, and the second mixer 28 may output a second mixed feedstock with a second composition, and the first and second compositions may differ in a percentage of feedstock, a percentage of water, a percentage of additives, a distribution of sizes of feedstock particles, solids concentration, viscosity, or a combination thereof. In some embodiments, the fine feedstock 18 in the first mixer 26 may be mixed with one or more materials (e.g., liquids, such as water) to decrease the concentration of solid feedstock in the fine feedstock 18. The fine feedstock 18 in the second mixer 28 may be mixed with one or more materials (e.g., additional solids of equal, greater, or lesser particle size) to increase the concentration of solid feedstock in the fine feedstock 18. Additionally, the fine feedstock 18 in the third mixer 30 may be mixed with one or more materials to adjust the viscosity of the fine feedstock 18 and/or the concentration of the solid feedstock in the fine feedstock 18. The one or more materials provided to each of the mixers 26, 28, and 30 may be the same type or different types of materials. Additionally, the amount of the one or more materials provided to each of the mixers 26, 28, and 30 may be the same or different. As will be described in FIG. 2, the delivery of the materials to the mixers 26, 28, and 30 may be controlled by a controller.

In some embodiments, one or more of the mixers 26, 28, and 30 may receive a coarse feedstock 32. In certain embodiments, a second feedstock preparation system 34 may receive a solid feedstock (e.g., fuel, such as coal, biomass, petroleum coke, any other carbonaceous fuel, or a combination thereof), to produce the coarse feedstock 32. The coarse feedstock 32 may include the same type of solid feedstock or a different type of solid feedstock as the fine feedstock 18. The second feedstock preparation system 34 may include a crusher, a grinder, a mill, or any other suitable component to generate the coarse feedstock 32. The coarse feedstock 32 may have an average particle size of between 20% and 1000% larger than the average particle size of the solid feedstock in the fine feedstock 18. In certain embodiments, the coarse feedstock 32 may have particles of the solid feedstock with an average particle size of between 30% and 900%, 40% and 700%, 50% and 500%, and/or, 100% and 300% larger than the particles of the solid feedstock in the fine feedstock 18. In some embodiments, the coarse feedstock 32 may have particles of the solid feedstock with an average particle size that is at least 0.1, 0.2, 0.3, 0.4, 0.5, 1, 2, 3, 4, or 5 times larger than the particles of the solid feedstock in the fine feedstock 18. By mixing the fine feedstock 18 with the coarse feedstock 32, the concentration of the solid feedstock in the resulting, mixed feedstock may be increased as compared to the fine feedstock 18, while maintaining a viscosity of the resulting, mixed feedstock below a predetermined threshold.

Additionally, one or more of the mixers 26, 28, and 30 may receive an intermediate sized feedstock 36. The intermediate sized feedstock 36 may be produced by a third feedstock preparation system 38. The third feedstock preparation system 38 may include a crusher, a grinder, a mill, or any other suitable component to produce the intermediate sized feedstock 36 from a solid feedstock (e.g., fuel, such as coal, biomass, petroleum coke, any other carbonaceous fuel, or a combination thereof). The intermediate sized feedstock 36 may include the same type of solid feedstock or a different type of solid feedstock as the fine feedstock 18. The intermediate sized feedstock 36 may have an average particle size that is larger than an average particle size of the fine feedstock 18 and smaller than an average particle size of the coarse feedstock 32. For example, the intermediate sized feedstock 36 may have particles of the solid feedstock with an average particle size that is at least 0.1, 0.2, 0.3, 0.4, 0.5, 1, 2, 3, 4, or 5 times larger than the particles of the solid feedstock in the fine feedstock 18 and that is 0.01 to 0.9, 0.05 to 0.8, 0.1 to 0.7, 0.2 to 0.6, or 0.3 to 0.5 of the average particle size of the solid feedstock in the coarse feedstock 32. By mixing the fine feedstock 18 with the intermediate sized feedstock 36, the concentration of the solid feedstock in the resulting, mixed feedstock may be increased as compared to the fine feedstock 18, while maintaining a viscosity of the resulting, mixed feedstock below a predetermined threshold.

Further, in certain embodiments, one or more of the mixers 26, 28, and 30 may receive a feedstock 40 (e.g., from a feedstock supply, a feedstock preparation system, etc.), water 42 (e.g., from a supply of water, a water tank, etc.), and/or an additive 44 (e.g., from a supply of an additive, an additive tank, etc.). For example, the feedstock 40 may be a solid, liquid, and/or gaseous carbonaceous fuel source, such as coal, petroleum coke, oil, and/or biomass. Adding the feedstock 40 to the fine feedstock 18 may increase the concentration of the solid feedstock in the resulting, mixed feedstock. The water 42 may include fresh water, salt water, recycled water, any other liquid, or a combination thereof. By way of example, the recycled water may include, but is not limited to, grey water, produced water, boiler feed water, or any other suitable recycled water source. Additionally, the additive 44 may include friction reducers, free water agents, suspending agents, phase transfer agents, and/or viscosity modifiers. For example, the additive 44 may include polymers, such as, but not limited to, polysaccharides (e.g. xanthum gum, cellulose, and their derivatives), polyacrylamides, polyacrylates, polysulfuric acids, lignosulfonates, or any combination thereof. Adding the water 42 and/or the additive 44 to the fine feedstock 18 may decrease the concentration of the solid feedstock in the resulting, mixed feedstock.

After the fine feedstock 18 is mixed with one or more desired materials in the mixers 26, 28, and 30, a mixed feedstock 46 from each of the mixers 26, 28, and 30 may be delivered to one or more downstream systems 48. As noted above, the mixed feedstock 46 from each mixer 26, 28, and 30 may be the same or different depending on the one or more materials mixed with the fine feedstock 18 in each mixer 26, 28, and 30. The one or more downstream systems 48 may include one or more tanks (e.g., storage tanks, holding tanks, buffer tanks, etc.), one or more mixers, one or more gasifiers, one or more reactors, one or more combustion systems, or any other suitable components. It should be appreciated that the mixed feedstocks 46 may be delivered to the same or different downstream systems 48. For example, in some embodiments, each mixed feedstock 46 may be delivered to a different gasifier, reactor, or combustion system.

Figure 2:
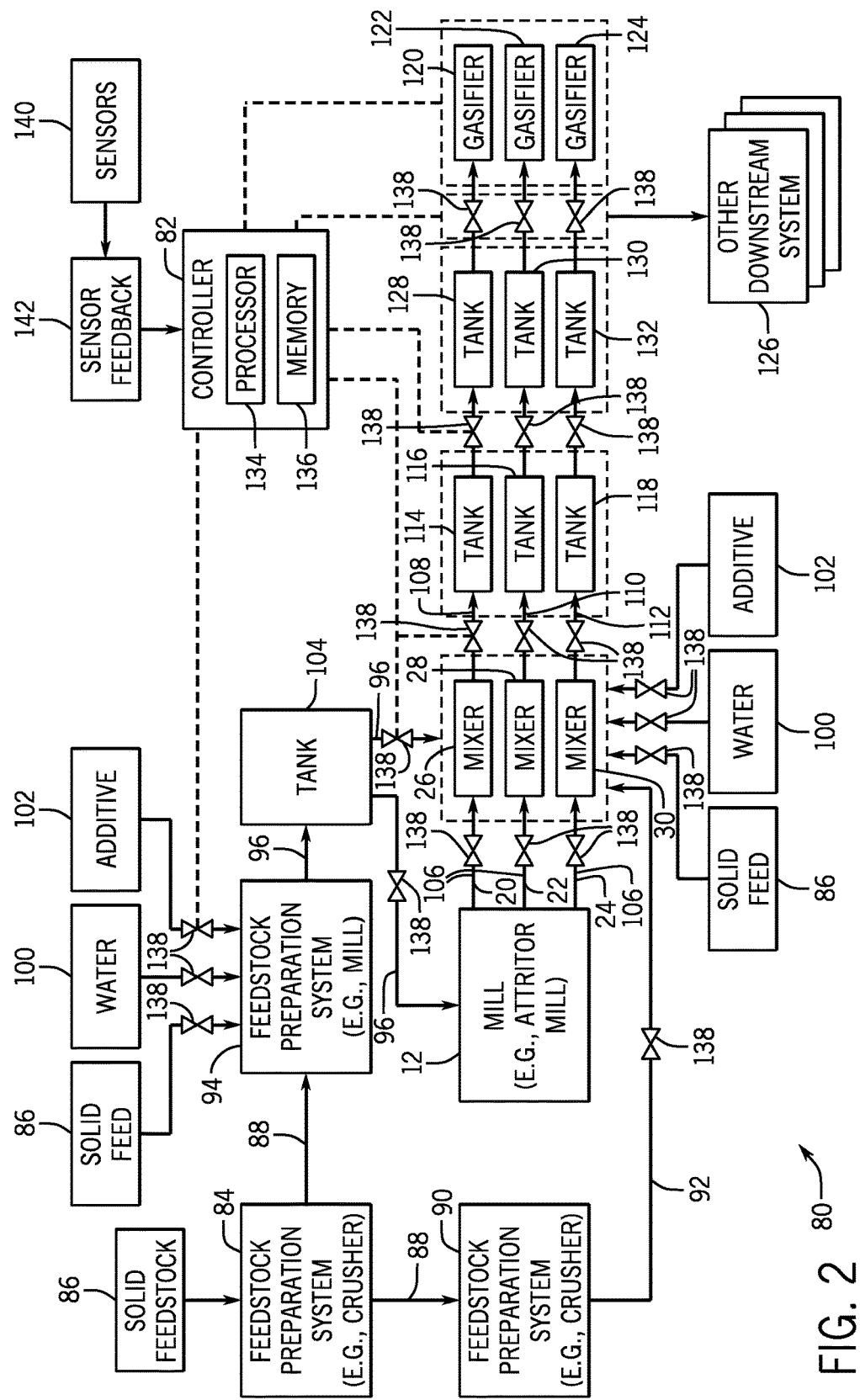
FIG. 2 is a block diagram of an embodiment of a system for producing a feedstock with a desired solids concentration including a controller.

FIG. 2 illustrates a block diagram of a system 80 including the mill 12 and a controller 82 (e.g., an electronic controller) configured to control the mixing of the feedstock discharged from the mill 12. The system 80 of FIG. 2 may be a detailed embodiment of at least a portion of the system 10 of FIG. 1. As illustrated, the system 80 may include a first feedstock preparation system 84 configured to receive a solid feedstock 86 and to break up (e.g., crush, grind, pulverize, etc.) the solid feedstock 86 to produce a first feedstock 88. The first feedstock preparation system 84 of FIG. 2 may represent an embodiment of at least a portion of the first feedstock preparation system 14 of FIG. 1. The solid feedstock 86 may include a solid fuel, such as coal, biomass, petroleum coke, any other carbonaceous fuel, or a combination thereof. The first feedstock preparation system 84 may include a crusher, a grinder, a pulverizer, a mill, or any other suitable component for producing smaller particles of the solid feedstock 86 to generate the first feedstock 88. For example, in certain embodiments, the particles of the solid feedstock 86 in the first feedstock 88 may be between approximately 10% and 25% smaller than the particles of the solid feedstock 86. In some embodiments, the average particle size of the solid feedstock 86 in the first feedstock 88 may be approximately 0.5 to 0.99, 0.6 to 0.95, or 0.75 to 0.9 of the average particle size of the solid feedstock 86.

A first portion of the first feedstock 88 may be delivered to a second feedstock preparation system 90. The second feedstock preparation system 90 may include a crusher, a grinder, a pulverizer, a mill, or any other suitable component for producing smaller particles of the first feedstock 88 to generate a second feedstock 92. For example, in certain embodiments, the first feedstock preparation system 84 may be a primary crusher configured to crush coarse particles into intermediate particles, and the second feedstock preparation system 90 may be a secondary crusher configured to crush intermediate particles into finer particles. In certain embodiments, the particles of the solid feedstock 86 in the second feedstock 92 may be between approximately 10% and 100%, 20% and 75%, or 30% and 50% smaller than the particles of the solid feedstock 86 in the first feedstock 88. In some embodiments, the average particle size of the solid feedstock 86 in the second feedstock 92 may be approximately 0.01 to 0.9, 0.05 to 0.8, 0.1 to 0.7, 0.2 to 0.6, or 0.3 to 0.5 of the average particle size of the solid feedstock 86 in the first feedstock 88.

Additionally, a second portion of the first feedstock 88 may be delivered to a third feedstock preparation system 94. The third feedstock preparation system 94 of FIG. 2 may represent an embodiment of at least a portion of the third feedstock preparation system 38 of FIG. 1. The third feedstock preparation system 94 may include a crusher, a grinder, a pulverizer, a mill, or any other suitable component for producing smaller particles of the first feedstock 88 to generate a third feedstock 96. In some embodiments, the particles of the solid feedstock 86 in the third feedstock 96 may be between approximately 10% and 200%, 20% and 150%, 30% and 100%, or 50% and 75% smaller than the particles of the solid feedstock 86 in the first feedstock 88. In some embodiments, the average particle size of the solid feedstock 86 in the third feedstock 96 may be approximately 0.01 to 0.9, 0.05 to 0.8, 0.1 to 0.7, 0.2 to 0.6, or 0.3 to 0.5 of the average particle size of the solid feedstock in the first feedstock 88.

In some embodiments, the third feedstock preparation system 94 may receive one or more additional materials to generate the third feedstock 96 with a desired concentration, viscosity, or composition. For example, the third feedstock preparation system 94 may also receive additional solid feedstock 86 (e.g., solid feedstock with equal, greater, or lesser sized particles) to increase the concentration of the solid feedstock 86 in the third feedstock 96. Additionally, the third feedstock preparation system 94 may receive water 100 (e.g., fresh water, salt water, recycled water, and/or any other liquids), and/or one or more additives 102 (e.g., friction reducers, free water agents, suspending agents, phase transfer agents, and/or viscosity modifiers) to adjust the properties of the third feedstock 96. In certain embodiments, the third feedstock preparation system 94 may also include one or more agitation features such as, but not limited to, an impeller, a sonication system (e.g., a sonicator configured to generate ultrasound waves to agitate particles), or the like to mix the second portion of the first feedstock 88 with the solid feedstock 86, the water 100, and/or the additives 102 to generate the third feedstock 96. The third feedstock 96 may be transported to a tank 104, such as a storage tank, a holding tank, a feed tank, a buffer tank, etc. In certain embodiments, the tank 104 may include one or more agitation mechanisms, such as a paddle pump, mixer, and/or blender, to maintain a homogenous mixture of the third feedstock 96.

As noted above, the third feedstock 96 may be, at least, a mixture of the first feedstock 88 and the solid feedstock 86. Accordingly, the third feedstock 96 may have a higher concentration of the solid feedstock 86 (e.g., a higher concentration of particles from the solid feedstock 86) as compared to the first feedstock 88. For example, in certain embodiments, the concentration of the solid feedstock 86 in the third feedstock 96 may be between approximately 5% and 40%, 10% and 30%, or 15% and 20% higher than the concentration of the solid feedstock 86 in the first feedstock 88. Due to the higher concentration of the solid feedstock 86, the third feedstock 96 may have a higher viscosity than the viscosity of the first feedstock 88. For example, the viscosity of the third feedstock 96 may be between approximately 50% and 500% more, such as between approximately 100% and 400% or 200% and 300% more than the viscosity of the first feedstock 88.

Additionally, the third feedstock 96 may be transported from the tank 104 to the mill 12. As noted above in FIG. 1, the mill 12 may be an attritor mill, a colloid mill, a ball mill, a ball and tube mill, or any other suitable mill. The mill 12 may be configured to break up (e.g., crush, grind, pulverize, etc.) the particles in the third feedstock 96 to generate a fourth feedstock 106. For example, in certain embodiments, the particles of the solid feedstock 86 in the fourth feedstock 106 may be between approximately 10% and 500% smaller than the particles of the solid feedstock 86 in the third feedstock 96. In some embodiments, the particles of the solid feedstock 86 in the fourth feedstock 106 may be between approximately 20% and 250%, 30% and 100%, or 50% and 75% smaller than the particles of the solid feedstock 86 in the third feedstock 96. In some embodiments, the average particle size of the solid feedstock 86 in the fourth feedstock 106 may be approximately 0.01 to 0.9, 0.05 to 0.8, 0.1 to 0.7, 0.2 to 0.6, or 0.3 to 0.5 of the average particle size of the solid feedstock 86 in the third feedstock 96. However, because the mill 12 may not receive additional solid feedstock 86, the fourth feedstock 106 may have approximately (e.g., within 1%, 2%, 3%, 4%, or 5% of) the same concentration and viscosity as the third feedstock 96.

To adjust the concentration, viscosity, and/or composition of the fourth feedstock 106, the fourth feedstock 106 may be delivered to a plurality of mixers. For example, a first portion of the fourth feedstock 106 may be discharged from the first output 20 of the mill 12 and delivered to the first mixer 26, a second portion of the fourth feedstock 106 may be discharged from the second output 22 of the mill 12 and delivered to the second mixer 28, and a third portion of the fourth feedstock 106 may be discharged from the third output 24 of the mill 12 and delivered to the third mixer 30. The mixers 26, 28, and 30 may be configured to mix the fourth feedstock 106 with one or more materials, such as the second feedstock 92, the additional solid feedstock 86, the water 100, the one or more additives 102, and/or any other suitable material, such as another feedstock (e.g., an intermediate feedstock, a mixed feedstock having solid particles of varying sizes) from a milling unit (e.g., a mill, a crusher, a grinder, etc.), a mixer, a tank, etc. The first mixer 26 may generate a first mixed feedstock 108, the second mixer 28 may generate a second mixed feedstock 110, and the third mixer may generate a third mixed feedstock 112. In certain embodiments, two or more of the first mixed feedstock 108, the second mixed feedstock 110, and the third mixed feedstock 112 may have the same concentration, viscosity, and/or composition. In other embodiments, two or more of the first mixed feedstock 108, the second mixed feedstock 110, and the third mixed feedstock 112 may have a different concentration, viscosity, and/or composition.

Additionally, the first mixed feedstock 108, the second mixed feedstock 110, and the third mixed feedstock 112 may be delivered to any suitable component of the system 80. In some embodiments, two or more of the first mixed feedstock 108, the second mixed feedstock 110, and the third mixed feedstock 112 may be delivered to the same component or components of the system 80. In other embodiments, two or more of the first mixed feedstock 108, the second mixed feedstock 110, and the third mixed feedstock 112 may be delivered to different components of the system 80. In certain embodiments, the first mixed feedstock 108, the second mixed feedstock 110, and/or the third mixed feedstock 112 may be delivered to one or more tanks (e.g., storage tanks, holding tanks, buffer tanks, etc.) before the first mixed feedstock 108, the second mixed feedstock 110, and/or the third mixed feedstock 112 is delivered to another component of the system 80. For example, as illustrated, the first mixed feedstock 108 may be delivered to a first tank 114, the second mixed feedstock 110 may be delivered to a second tank 116, and the third mixed feedstock 112 may be delivered to a third tank 118. The tanks 114, 116, and/or 118 may include an agitation mechanism, such as, but not limited to a paddle pump, a mixed, or a blender, to maintain a homogenous mixture of the first mixed feedstock 108, the second mixed feedstock 110, or the third mixed feedstock 112, respectively. Additionally, the thanks 114, 116, and/or 118 may be used to hold the first mixed feedstock 108, the second mixed feedstock 110, or the third mixed feedstock 112, respectively, at a desired temperature and pressure.

In some embodiments, the first mixed feedstock 108, the second mixed feedstock 110, and/or the third mixed feedstock 112 may be transported from the respective tank 114, 116, and/or 118 to one or more gasifiers. For example, the first mixed feedstock 108 may be directed from the first tank 114 to a first gasifier 120, the second mixed feedstock 110 may be directed from the second tank 116 to a second gasifier 122, and the third mixed feedstock 112 may be directed from the third tank 118 to a third gasifier 124. It should be noted that the gasifiers 120, 122, and/or 124 may be part of one or more integrated gasification combined cycle (IGCC) power plants or any other variety of plants that use or produce a syngas. The gasifiers 120, 122, and 124 subject the mixed feedstocks 108, 110, and 112, respectively, to gasification conditions to produce a syngas. In particular, as a result of being subjected to these conditions, the solid feedstock 86 (e.g., solid fuel) in the mixed feedstocks 108, 110, and 112 reacts with oxygen ($O_2$) and water ($H_2O$) to generate the syngas. Generally, the amount of the syngas that is produced, or the efficiency of its production, is limited by, among other things, the size of the gasifier as well as the amount of the solid feedstock 86 that enters the gasifier. Thus, a higher concentration of the solid feedstock 86 in the mixed feedstock 108, 110, or 112 means a higher energy content of the mixed feedstock 108, 110, or 112, resulting in increased gasification efficiency in producing the syngas.

In some embodiments, the first mixed feedstock 108, the second mixed feedstock 110, and/or the third mixed feedstock 112 may be transported to one or more downstream systems 126 of the system 80. The one or more downstream systems 126 may include any suitable components, such as tanks, mixers, feedstock preparation systems, supplies of water, supplies of additives, gasifiers, combustion systems, etc. Further, in certain embodiments, the first mixed feedstock 108, the second mixed feedstock 110, or the third mixed feedstock 112 may be delivered directly from the first mixer 26, the second mixer 28, or the third mixer 30, respectively, to the first gasifier 120, the second gasifier 122, the third gasifier 124, or the one or more downstream systems 126. That is, in some embodiments, there may not be a tank between the mixers 26, 28, and/or 30 and the gasifiers 120, 122, and/or 124 or between the mixers 26, 28, and/or 30 and the one or more downstream systems 126.

In some embodiments, the one or more downstream systems 126 may be coupled to one or more feedstock outlets of the mill 12 and may receive the fourth feedstock 106 from the mill 12. That is, in some embodiments, the one or more downstream systems 126 may be configured to mix the fourth feedstock 106 with one or more materials (e.g., feedstock, water, additives, etc.) to adjust the composition of the fourth feedstock 106. For example, a first downstream system of the one or more downstream systems 126 may be coupled to the first outlet 20 of the mill 12 and may be configured to output a first mixture (e.g., a first mixed feedstock) with a first composition. Additionally, a second downstream system of the one or more downstream systems 126 may be coupled to the second outlet 22 of the mill 12 and may be configured to output a second mixture (e.g., a second mixed feedstock) with a second composition that differs from the first composition in a percentage of feedstock, a percentage of water, a percentage of additives, a distribution of sizes of feedstock particles, solids concentration, viscosity, or a combination thereof.

In other embodiments, there may be multiple tanks and/or other vessels for conveying the first mixed feedstock 108, the second mixed feedstock 110, and/or the third mixed feedstock 112 to the gasifiers 120, 122, and/or 124 and/or to the one or more downstream systems 126. For example, as illustrated, the system 80 may include one or more intermediate tanks, such as a first intermediate tank 128 between the first tank 114 and the first gasifier 120, a second intermediate tank 130 between the second tank 116 and the second gasifier 122, and a third intermediate tank 132 between the third tank 118 and the third gasifier 124. It should be appreciated that the intermediate tanks 128, 130, and 132 may also include an agitation mechanism and may be used to hold the first mixed feedstock 108, the second mixed feedstock 110, and/or the third mixed feedstock 112 at a desired temperature and pressure.

The controller 82 may be configured to control operation of the components of the system 80 and to control the concentration, viscosity, and/or composition of the first mixed feedstock 108, the second mixed feedstock 110, and the third mixed feedstock 112 by controlling valves, pumps, or other flow adjusting features throughout the system 80. For example, the controller 82 may include one or more processors 134 and one or more memory devices 136 (e.g., tangible, non-transitory, machine-readable media) storing instructions executable by the one or more processors 134 to control actions described herein. In certain embodiments, the one or more memory devices 136 may store instructions to control the parameters for the first mixed feedstock 108, the second mixed feedstock 110, and the third mixed feedstock 112. In some embodiments, the one or more memory devices 136 may store instructions to control the delivery of the fourth feedstock 106 from the outputs (e.g., the outputs 20, 22, and 24) of the mill 12.

In some embodiments, the controller 82 may operate flow control devices 138 to control amounts and/or flows between different system components. The flow control devices 138 may include valves (e.g., electronically actuated valves), motors, actuators, and/or pumps. For example, the controller 82 may control flow control devices 138 to control the amount and/or flow of the solid feedstock 86, the water 100, and/or the additive 102 to the third feedstock preparation system 94. Further, the controller 82 may control the amount and/or flow of the second feedstock 92, the third feedstock 96, the solid feedstock 86, the water 100, and/or the additive 102 to the mixers 26, 28, and/or 30. Additionally, the controller 82 may control flow control devices 138 to control the amount and/or flow of the fourth feedstock 106 from the outputs of the mill 12 (e.g., the outputs 20, 22, and/or 24) to one or more components of the system 80, such as the mixers 26, 28, and/or 30, the tanks 114, 116, and/or 118, the intermediate tanks 128, 130, and/or 132, the gasifiers 120, 122, and/or 124, the one or more downstream systems 126, or any combination thereof. Further, the controller 82 may control flow control devices 138 to control the amount and/or flow of the first mixed feedstock 108, the second mixed feedstock 110, and/or the third mixed feedstock 112 from first mixer 26, the second mixer 28, and/or the third mixer 30, respectively, to one or more components of the system 80, such as the tanks 114, 116, and/or 118, the intermediate tanks 128, 130, and/or 132, the gasifiers 120, 122, and/or 124, the one or more downstream systems 126, or any combination thereof. It should be appreciated that the system 80 may include any suitable number of flow control devices 118 in any suitable location throughout the system 80 to control different amounts and/or flows between various components of the system 80.

In certain embodiments, the system 80 may also include one or more sensors 140 to generate sensor feedback 142. The controller 82 may use the sensor feedback 142 to control operation of the components of the system 80 and to control the concentration, viscosity, and/or composition of the first mixed feedstock 108, the second mixed feedstock 110, and the third mixed feedstock 112. For example, in some embodiments, the controller 82 may use the sensor feedback 142 to control operation of the flow control devices 138 to control the concentration, viscosity, and/or composition of the first mixed feedstock 108, the second mixed feedstock 110, and the third mixed feedstock 112. The sensors 140 include flow rate sensors, pressure sensors, temperature sensors, vibration sensors, speed sensors, proximity sensors, material composition sensors, viscosity sensors, gasification sensors, or any other suitable sensors. Additionally, the sensors 140 may be disposed about any suitable location throughout the system 80. For example, one or more sensors 140 may be disposed on or integral with one or more flow control devices 138. In some embodiments, one or more sensors 140 may be disposed on or within pipes of the system 80 (e.g., proximate to one or more flow control devices 138). In certain embodiments, one or more sensors 140 may be disposed on, within, and/or proximate to various components of the system 80, such as, the mill 12, the mixers 26, 28, and/or 30, the first feedstock preparation system 84, the second feedstock preparation system 90, the third feedstock preparation system 94, the tank 104, the gasifiers 120, 122 and/or 124, the other downstream systems 126, or any other component of the system 80.

Figure 3:
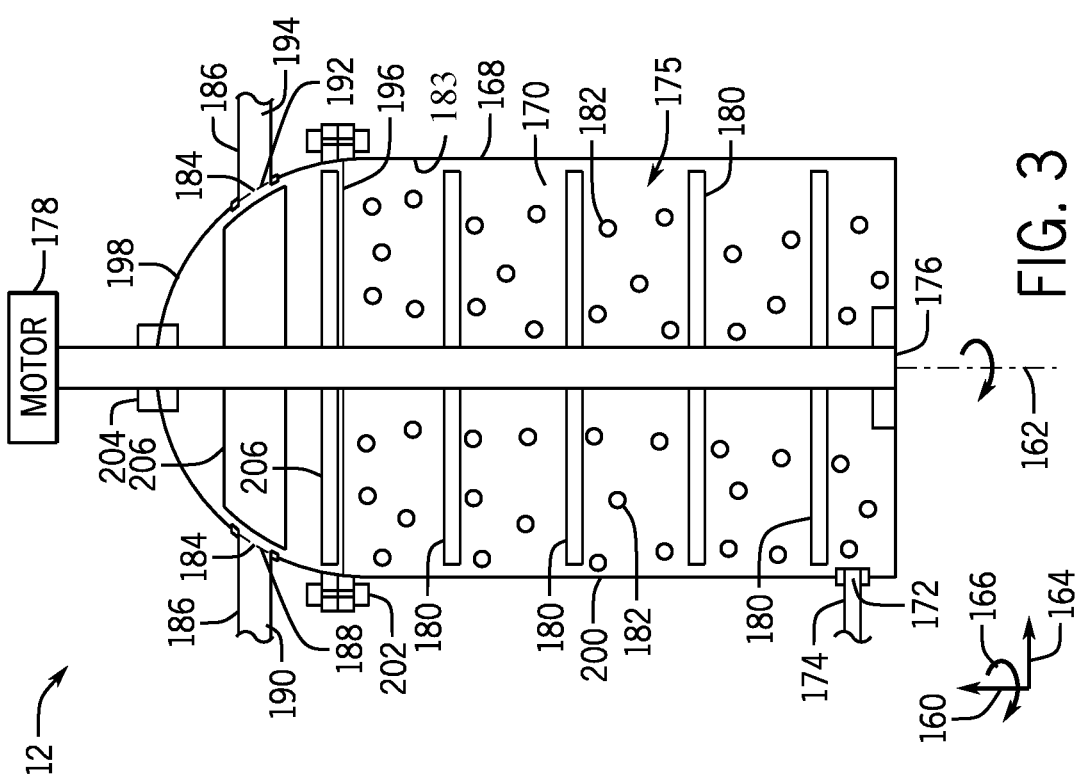
FIG. 3 is a cross-sectional view of an embodiment of a mill having an output section for outputting a feedstock.

Turning now to FIG. 3, an embodiment of the mill 12 that prepares the fine feedstock 18 is shown. In the following discussion, reference may be made to various directions or axes, such as an axial direction 160 along a longitudinal axis 162 of the mill 12, a radial direction 164 away from the axis 162, and a circumferential direction 166 around the axis 162. In the illustrated embodiment, the mill 12 includes a housing 168 (e.g., an outer cylindrical wall) and a chamber 170 disposed in the housing 168. The housing 168 includes at least one feedstock inlet 172 that may receive a feedstock (e.g., the first feedstock 16, the fourth feedstock 96, etc.) from a feed line 174 (e.g., conduit, pipe, pump, etc.). While the feedstock inlet 172 is illustrated at the bottom on the housing 168, it should be noted that the feedstock inlet 172 may be located in any suitable position about the housing 168. For example, in other embodiments, the feedstock inlet 172 may be located at the top of the housing 168 or at an intermediate point between the top and bottom of the housing 168. Further, while only one feedstock inlet 172 is illustrated, it should be noted that in other embodiments, the mill 12 may include 2, 3, 4, 5, 6, 7, 8, 9, 10, or more feedstock inlets 172, which may be disposed about the same or different axial and/or circumferential positions about the housing 168.

The mill 12 includes a solids breakup assembly 175 disposed at least partially within the chamber 170 that is configured to break up (e.g., crush, pulverize, grind, etc.) the solid particles of the feedstock. In some embodiments, the solids breakup assembly 175 may include a shaft 176 (e.g., rod) extending in the axial direction 160 through the chamber 170. The solids breakup assembly 175 may also include a motor 178 (e.g., a drive) coupled to the shaft 176, which may cause the shaft 176 to rotate in the circumferential direction 166 about the axis 162. In certain embodiments, the solids breakup assembly 175 may include a plurality of arms 180 (e.g., radial structures, radial rods, impellers, blades, etc.) that are coupled to and extend outward from the shaft 176. The plurality of arms 180 may be any suitable size, shape, and material. For example, in some embodiments, the plurality of arms 180 may be cylindrical, rectangular, triangular, asymmetrical, and/or amorphous. Further, in some embodiments, the size, shape, and/or material may vary between one or more arms of the plurality of arms 180. The plurality of arms 180 may extend at least partially in the radial direction 164 from the shaft 176. In some embodiments, the solids breakup assembly 175 may also include a plurality of balls 182 disposed in the chamber 170. The plurality of balls 182 may be any suitable size, shape, and material. For example, in some embodiments, the plurality of balls 182 may be spherical, ovoid, polygonal, asymmetrical, and/or amorphous. Furthermore, in some embodiments, the size, shape, and/or material may be the same or vary between one or more (or all) balls of the plurality of balls 182. For example, multiple sizes of balls in the plurality of balls 182 may help fill space within the chamber 170 and may provide randomness of movement and pulverizing.

In operation, the motor 178 may rotate the shaft 176 with the plurality of arms 180. The rotating plurality of arms 180 may contact (e.g., strike) the plurality of balls 182 to transfer kinetic energy to the plurality of balls 182. This kinetic energy may set the plurality of balls 182 into motion (e.g., random motion), and the plurality of balls 182 may impinge upon each other, an inner wall 183 of the housing 168, and the feedstock disposed in the chamber 170 to break up (e.g., grind, pulverize, crush, etc.) solid particles of the feedstock. The mill 12 also includes at least two feedstock outlets 184 through the housing 168 that may output the crushed feedstock. As noted above, the mill 12 may include any suitable number of feedstock outlets 184, such as 2, 3, 4, 5, 6, 7, 8, 9, 10, or more. The feedstock outlets 184 may each be disposed about any suitable location about the housing 168, such as the top of the housing 168, the bottom of the housing 168, or any intermediate position between the top and bottom of the housing 168. Further, the feedstock outlets 184 may be axial outlets, radial outlets, or a combination thereof. Additionally, the feedstock outlets 184 may be any suitable shape, such as rectangular, square, circular, oval, noncircular, triangular, amorphous, etc, and the shape may vary between the feedstock outlets 184. In certain embodiments, it may be desirable to have rectangular or square feedstock outlets 184, rather than circular outlets 184, to increase the area through which the feedstock is discharged, which may facilitate the discharge of highly viscous feedstocks. Further, the feedstock outlets 184 may be any suitable size (e.g., cross-sectional area), and one or more of the feedstock outlets 184 may be the same size or different sizes. In some embodiments, the feedstock outlets 184 may include baffles to adjust the size of openings of the feedstock outlets 184. Additionally, the feedstock outlets 184 may be disposed directly adjacent to each other, spaced apart from one another, or a combination thereof. Further, the feedstock outlets 184 may be axially arranged or vertically stacked, circumferentially arranged or spaced, or a combination thereof. Additionally, the feedstock outlets 184 may be arranged symmetrically or asymmetrically about an axis of the housing 168 (e.g., the longitudinal axis 162).

As noted above, by providing the two or more feedstock outlets 184 for the mill 12, the feedstock discharged from the mill 12 may be delivered to more than one downstream component, which increases the versatility of a system having the mill 12. To facilitate delivery of the feedstock to different downstream components, in certain embodiments, each feedstock outlet 184 may be coupled to a different conduit 186 (e.g., pipe) and each feedstock outlet 184 may output the crushed feedstock to the respective conduit 186. For example, in the illustrated embodiment, the mill 12 includes a first outlet 188 that outputs the crushed feedstock to a first conduit 190 and a second outlet 192 that outputs the crushed feedstock to a second conduit 194. The first conduit 190 may deliver the feedstock to a first downstream component (e.g., the first mixer 26 or any other suitable component) and the second conduit 192 may deliver the feedstock to a second downstream component (e.g., the second mixer 28 or any other suitable component) different from the first downstream component.

In some embodiments, the mill 12 may include a screen 196 (e.g., mesh screen, barrier, etc.) to block or prevent the plurality of balls 182 from exiting the housing 168 via the feedstock outlets 184. For example, the screen 196 may include openings sized to facilitate passage of the feedstock through the screen 196 and to block or prevent passage of the plurality of balls 182. In certain embodiments, the screen 196 may be disposed between the plurality of rotating arms 180 and the feedstock outlets 184.

In certain embodiments, the feedstock outlets 184 may be disposed in a cover portion 198 of the housing 168. The cover portion 198 may be disposed about the top of the housing 168, as illustrated, or at the bottom of the housing 168. The cover portion 198 may be secured to a body portion 200 of the housing 168 via one or more fasteners 202, such as bolts, screws, etc. The cover portion 198 may include a seal 204 (e.g., a gasket, gland, rubber, etc.) surrounding a portion of the shaft 176 where the shaft 176 enters the cover portion 198. The seal 204 may allow for rotation of the shaft 176 under mill discharge pressure conditions, while reducing, minimizing, or blocking discharge of the feedstock where the shaft 176 enters the cover portion 198. While the illustrated embodiment of the cover portion 198 is domed (e.g., rounded, concave, or semi-spherical), the cover portion 198 may be any suitable shape. For example, in other embodiments, the cover portion 198 may be rectangular (e.g., a top portion of the cover portion 198 may be flat). Further, it should be noted that in some embodiments, the mill 12 may not include the cover portion 198, and the feedstock outlets 184 may be disposed about any suitable axial and circumferential positions of the housing 168. In some embodiments, the cover portion 198 may be retrofitted to existing mills having only one feedstock outlet. For example, a discharge section with only one feedstock outlet of a mill may be removed and the cover portion 198 may be retrofitted to the mill in place of the discharge section.

Further, in some embodiments, the mill 12 may include one or more rotating arms 206 to facilitate the discharge of the feedstock through the feedstock outlets 184. The one or more rotating arms 206 may be disposed in the cover portion 198, if present, or in another discharge area of the mill 12 proximate to the feedstock outlets 184. As noted above, the feedstock (e.g., the first feedstock 16, the fourth feedstock 96, etc.) may include a high concentration of solid particles (e.g., solid feedstock), because a concentrated feedstock may be desirable to increase gasification efficiencies. However, the high concentration of solid particles in the feedstock may cause the feedstock to become highly viscous, which may be difficult to discharge from the mill 12. Accordingly, the one or more rotating arms 206 may be desirable to facilitate the discharge of the feedstock through the feedstock outlets 184 to reduce, minimize, or prevent accumulation of the feedstock in the cover portion 198 or discharge area of the mill 12.

As illustrated, the one or more rotating arms 206 may be coupled to the shaft 176 and may extend outward from the shaft 176. Any suitable number of rotating arms 206 may be used, such as, for example, 1, 2, 3, 4, 5, 6, 7, 8, 9, 10, or more. Additionally, the one or more rotating arms 206 may be disposed about one or more axial positions along the axis 162. Further, the one or more rotating arms 206 may be any suitable material, size, and shape (e.g., cylindrical, rectangular, curved, sickle-shaped, etc.). Still further, the material, size (e.g., length, diameter, etc.), and/or shape may vary between arms of the one or more rotating arms 206.

Figure 4:
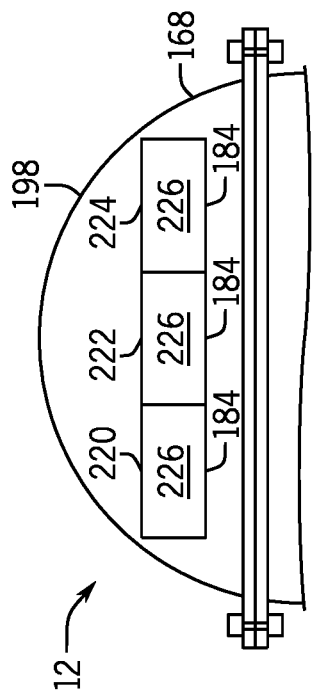
FIG. 4 is a partial side view of an embodiment of a mill having a rounded output section with a plurality of feedstock outlets for outputting a feedstock.

As shown in FIG. 4, the feedstock outlets 184 may be circumferentially arranged or spaced about the housing 168 (e.g., the cover portion 198) of the mill 12. In particular, a first feedstock outlet 220, a second feedstock outlet 222, and a third feedstock outlet 224 of the feedstock outlets 184 are circumferentially arranged or spaced (i.e., position varies in the circumferential direction 166). Further, as illustrated, the first feedstock outlet 220, the second feedstock outlet 222, and the third feedstock outlet 224 are each rectangular and are disposed directly adjacent to one another in a side by side arrangement. Additionally, the first feedstock outlet 220, the second feedstock outlet 222, and the third feedstock outlet 224 have the same cross-sectional area 226.

Figure 5:
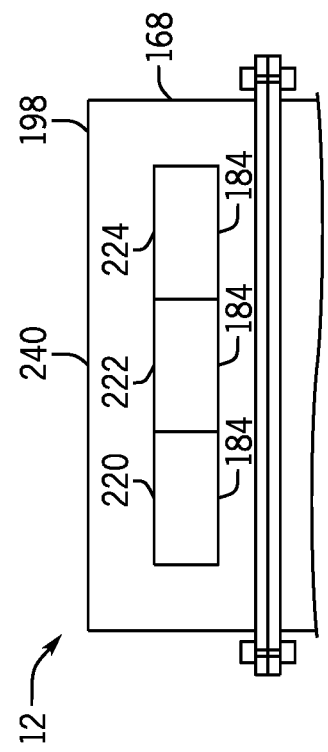
FIG. 5 is a partial side view of an embodiment of a mill having a rectangular output section with a plurality of feedstock outlets for outputting a feedstock.

As noted above, in some embodiments, the cover portion 198 may not be domed. For example, FIG. 5 illustrates an embodiment of the cover portion 198 of the mill 12 that includes a substantially flat top surface 240 and a substantially cylindrical side wall. In certain embodiments, the cover portion 198 with the flat top surface 240 may be cylindrical or polygonal. Further, as illustrated, the cover portion 198 may include the feedstock outlets 184, such as the equal-sized, circumferentially arranged, first feedstock outlet 220, second feedstock outlet 222, and third feedstock outlet 224.

Figure 6:
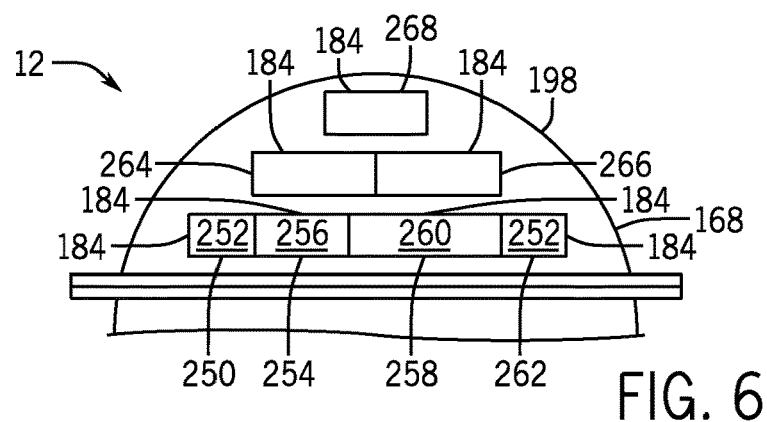
FIG. 6 is a partial side view of an embodiment of a mill having an output section with a plurality of rectangular feedstock outlets arranged along multiple positions about an axial axis of the mill.

FIG. 6 illustrates an embodiment of the cover portion 198 that includes feedstock outlets 184 that vary in size and that are axially and circumferentially arranged or spaced. For example, a first feedstock outlet 250 of the feedstock outlets 184 has a first cross-sectional area 252, a second feedstock outlet 254 of the feedstock outlets 184 has a second cross-sectional area 256, and a third feedstock outlet 258 of the feedstock outlets 184 has a third cross-sectional area 260. The first cross-sectional area 252 is smaller than the second cross-sectional area 256, and the second cross-sectional area 256 is smaller than the third cross-sectional area 260. Additionally, the feedstock outlets 184 include a fourth feedstock outlet 262 that has the first cross-sectional area 252. As illustrated, the first, second, third, and fourth feedstock outlets 250, 254, 258, and 262 are disposed directly adjacent to one another in a side by side arrangement. It should be noted that in other embodiments, one or more of the first, second, third, and fourth feedstock outlets 250, 254, 258, and 262 may be spaced apart. Additionally, the first, second, third, and fourth feedstock outlets 250, 254, 258, and 262 are circumferentially arranged. The cover portion 198 also includes feedstock outlets 184 that are axially arranged. In particular, a fifth feedstock outlet 264 and a sixth feedstock outlet 266 of the feedstock outlets 184 are circumferentially arranged with respect to one another and are axially arranged with respect to the first, second, third, and fourth feedstock outlets 250, 254, 258, and 262. Additionally, a seventh feedstock outlet 268 is axially arranged with the first, second, third, fourth, fifth, and sixth feedstock outlets 250, 254, 258, 262, 264, and 266. Further, as illustrated, the fifth and sixth feedstock outlets 264 and 266 are spaced apart from and disposed between the first, second, third, and fourth feedstock outlets 250, 254, 258, and 262 and the seventh feedstock outlet 268. Additionally, as illustrated, the first, second, third, fourth, fifth, sixth, and seventh feedstock outlets 250, 254, 258, 262, 264, 266, and 268 may be arranged in a pyramid (e.g., a pyramid arrangement).

Figure 7:
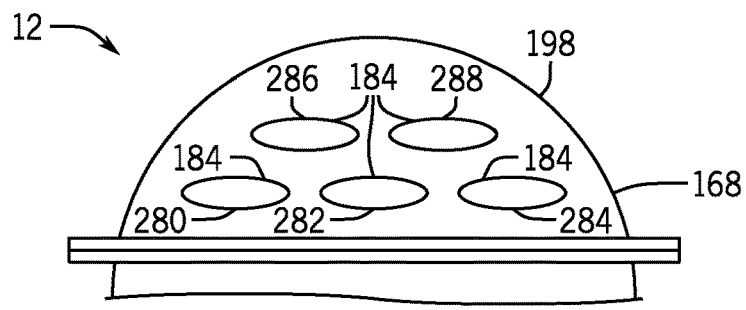
FIG. 7 is a partial side view of an embodiment of a mill having an output section with a plurality of oval feedstock outlets arranged along multiple positions about an axial axis of the mill.

FIG. 7 illustrates an embodiment of the cover portion 198 that includes feedstock outlets 184 that are spaced apart from one another, circumferentially arranged, and axially arranged. In particular, a first feedstock outlet 280, a second feedstock outlet 282, and a third feedstock outlet 284 of the feedstock outlets 184 are circumferentially arranged with respect to one another. Additionally, a fourth feedstock outlet 286 and a fifth feedstock outlet 288 are circumferentially arranged with respect to one another. The first feedstock outlet 280, the second feedstock outlet 282, and the third feedstock outlet 284 are axially arranged with respect to the fourth feedstock outlet 286 and the fifth feedstock outlet 288. Additionally, as illustrated, the first, second, third, fourth, and fifth feedstock outlets 280, 282, 284, 296, and 288 are each spaced apart from one another. Further, the first, second, third, fourth, and fifth feedstock outlets 280, 282, 284, 296, and 288 are each oval in shape.

Figure 8:
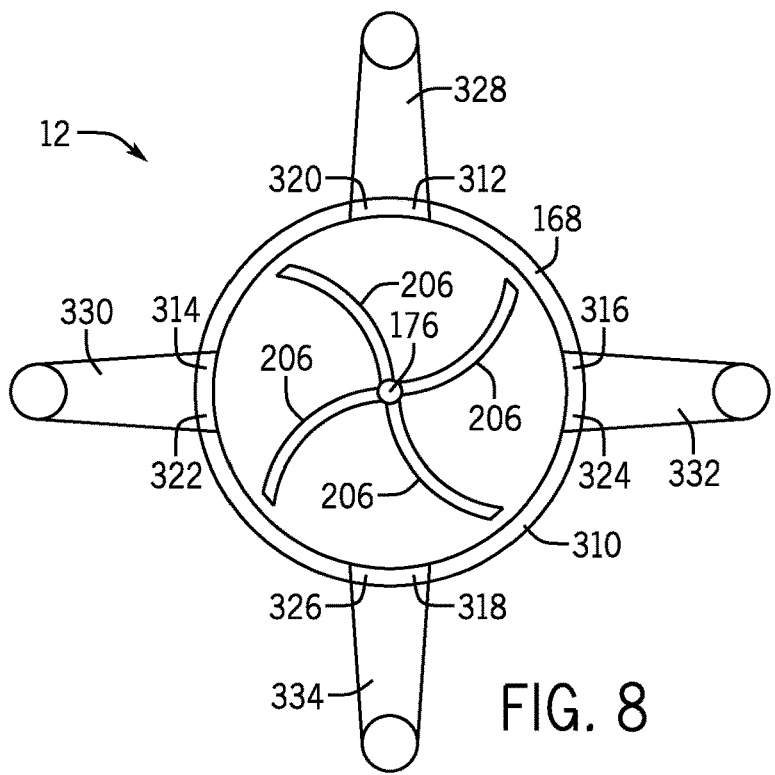
FIG. 8 is a top plan view of an embodiment of a discharge section of a mill having a plurality of feedstock outlets.

FIG. 8 is a plan view of an embodiment of the mill 12 illustrating the rotating arms 206 that may facilitate the discharge of feedstock through the feedstock outlets 184. In the illustrated embodiment, the feedstock outlets 184 and the rotating arms 206 are disposed in a discharge section 310 of the housing 168. The discharge section 310 may be located about any suitable axial location of the housing 168. For example, the discharge section 310 may be disposed in the body section 200 of the housing 168 or the cover portion 198 of the housing 168, if utilized. As illustrated, four, curved rotating arms 206 are disposed in the discharge section 310. However, as noted above, any number of rotating arms 206 may be used (e.g., 1 2, 3, 4, 5, 6, 7, 8, 9, 10, or more) and the rotating arms 206 may be any suitable shape, such as cylindrical, rectangular, etc.

Additionally, as illustrated, the feedstock outlets 184 may include a first feedstock outlet 312, a second feedstock outlet 314, a third feedstock outlet 316, and a fourth feedstock outlet 318. The first, second, third, and fourth feedstock outlets 312, 314, 316, and 318 may be spaced apart from one another, as illustrated, disposed directly adjacent to one another, or a combination thereof. As illustrated, the first, second, third, and fourth feedstock outlets 312, 314, 316, and 318 may be equally spaced apart (e.g., symmetrically arranged about the longitudinal axis 162 of the mill 12). In some embodiments, the spacing between the first, second, third, and fourth feedstock outlets 312, 314, 316, and 318 may vary (e.g., asymmetrically arranged about the longitudinal axis 162).

Further, as noted above, the cross-sectional areas of the feedstock outlets 184 may be the same or may vary. For example, the first feedstock outlet 312 has a first cross-sectional area 320, the second feedstock outlet 314 has a second cross-sectional area 322, the third feedstock outlet 316 has a third cross-sectional area 324, and the fourth feedstock outlet 318 has a fourth cross-sectional area 326. In some embodiments, the first, second, third, and fourth cross-sectional areas 320, 322, 324, and 326 may be equal, as illustrated. In some embodiments, two or more of the first, second, third, and fourth cross-sectional areas 320, 322, 324, and 326 may be different.

Additionally, as noted above, each feedstock outlet 184 may be coupled to a different conduit 186 to facilitate delivery of the feedstock to different downstream components where the feedstock may be used for different purposes. For example, the first feedstock outlet 312 is coupled to a first conduit 328, the second feedstock outlet 314 is coupled to a second conduit 330, the third feedstock outlet 316 is coupled to a third conduit 332, and the fourth feedstock outlet 318 is coupled to a fourth conduit 334. As illustrated, the first, second, third, and fourth conduits 328, 330, 332, and 334 may be tapered conduits with circular outlets. In some embodiments, the diameter of one or more of the first, second, third, and fourth conduits 328, 330, 332, and 334 may decrease, increase, or be constant along a length of the respective conduit relative to the respective feedstock outlet. Further, the outlets of the first, second, third, and fourth conduits 328, 330, 332, and 334 may be any suitable shape, such as circular, noncircular, rectangular, square, etc.

As noted above, the conduits 186 (e.g., the first, second, third, and fourth conduits 328, 330, 332, and 334) may deliver the crushed feedstock (e.g., the fourth feedstock 104) to one or more mixers (e.g., the first mixer 26, the second mixer 28, and the third mixer 30) where the feedstock may be mixed with other materials, such as one or more types of feedstock (e.g., the coarse feedstock 32, the intermediate sized feedstock 36, the feedstock 40, solid feedstock 86, the first feedstock 88, the second feedstock 92, the third feedstock 96, etc.), water (e.g., the water 42, the water 100, etc.), one or more types of additive (e.g., the additive 44, the additive 102, etc.), to adjust the concentration, viscosity, and/or composition of the feedstock. Additionally, the conduits 186 may deliver the crushed feedstock to one or more downstream systems (e.g., the downstream system 48, the other downstream systems 126, etc.) or to one or more gasifiers (e.g., the first gasifier 120, the second gasifier 122, the third gasifier 124, etc.) where the feedstock may be utilized (e.g., for gasification purposes). Further, the conduits 186 may deliver the crushed feedstock to one or more tanks (e.g., the tank 104, the first tank 114, the second tank 116, the third tank 118, the first intermediate tank 128, the second intermediate tank 130, the third intermediate tank 132, etc.) for storage or holding before the feedstock is delivered to another component. Additionally, the conduits 186 may deliver the crushed feedstock to one or more feedstock preparation systems (e.g., the first feedstock preparation system 14, the second feedstock preparation system 34, the third feedstock preparation system 38, the first feedstock preparation system 84, the second feedstock preparation system 90, the third feedstock preparation system, 94, the mill 12, etc.) for further breakdown of the solid particles in the feedstock and/or for mixing with other materials.

Further, as noted above, two or more of the conduits 186 may deliver the crushed feedstock to a different component. By way of example, the first conduit 328 may deliver the feedstock to a mixer, the second conduit 330 may deliver the feedstock to a gasifier, the third conduit 332 may deliver the feedstock to a downstream system, and the fourth conduit 334 may deliver the feedstock to a tank. However, it should be noted that any combination of the above components are possible.

Technical effects of the present embodiments include, among other things, the ability to increase the solids concentrations of fuel slurries used in gasification systems, reduce the viscosity, and modify other rheological properties of the slurry. In particular, mixing differently sized particles to get a greater (e.g., broader) size distribution of particles in a mixed feedstock may increase the concentration of solids in the mixed feedstock as compared to a feedstock with particles of a single size. Indeed, the use of a novel feedstock preparation system for generating a fuel slurry may enable an increase in the amount of carbon and oxygen available in the slurry for partial oxidation in the gasifier. Accordingly, low rank coal and other solid fuels, which typically only generate low solids concentrations, may also be used to generate concentrated fuel slurries. Further, technical effects of the present embodiments, among other things, include the ability to transport a feedstock from a mill to multiple different downstream components. Indeed, the use of a novel mill with two or more feedstock outlets may increase the versatility of a system having the mill by enabling the feedstock to be transported directly from the outputs of the mill to different downstream components of the system where the feedstock may be used for different purposes. Additionally, the multiple outlets of the mill may be sized and positioned about the mill to facilitate the discharge of viscous feedstocks from the mill.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a solid feedstock mill, comprising:
        a housing having a cover portion coupled to a body portion about a chamber, wherein the cover portion is disposed about a first chamber portion of the chamber, and the body portion is disposed about a second chamber portion of the chamber;
        a solids breakup assembly at least partially disposed inside the chamber, wherein the solids breakup assembly comprises a first rotary structure having one or more first projections disposed in the first chamber portion, and the solids breakup assembly comprises a second rotary structure having one or more second projections disposed in the second chamber portion;
        a feedstock inlet through the housing into the chamber; and
        a plurality of feedstock outlets through the cover portion of the housing from the chamber, wherein the plurality of feedstock outlets is disposed above the feedstock inlet, and the one or more first projections of the first rotary structure are configured to facilitate a discharge through the plurality of feedstock outlets.

2. The system of claim 1, comprising at least one of a first gasifier coupled to a first feedstock outlet of the plurality of feedstock outlets, a second gasifier coupled to a second feedstock outlet of the plurality of feedstock outlets, or a combination thereof.

3. The system of claim 1, wherein the one or more first projections comprise a plurality of rotating arms.

4. The system of claim 3, wherein the cover portion comprises a dome-shaped cover portion.

5. The system of claim 3, wherein the plurality of rotating arms are aligned with the plurality of feedstock outlets to facilitate the discharge radially outward through the plurality of feedstock outlets.

6. The system of claim 1, wherein the plurality of feedstock outlets comprises at least one of a non-circular outlet, a rectangular outlet, or an oval outlet.

7. The system of claim 1, wherein the plurality of feedstock outlets are arranged symmetrically about an axis of the housing.

8. The system of claim 1, wherein at least two of the plurality of feedstock outlets are disposed directly adjacent one another in a side by side arrangement.

9. The system of claim 1, wherein at least two of the plurality of feedstock outlets are disposed at a common axial position and different circumferential positions relative to an axis of the housing.

10. The system of claim 1, wherein the plurality of feedstock outlets comprises a plurality of axially arranged outlets, a plurality of circumferentially arranged outlets, or a combination thereof.

11. The system of claim 1, wherein the plurality of feedstock outlets comprises at least one axial outlet, at least one radial outlet, or a combination thereof.

12. The system of claim 1, wherein first and second outlets of the plurality of feedstock outlets comprise an equal cross-sectional area.

13. The system of claim 1, wherein first and second outlets of the plurality of feedstock outlets comprise different cross-sectional areas.

14. The system of claim 1, wherein the solids breakup assembly comprises a drive coupled to the first and second rotary structures, the one or more first projections comprise a first plurality of radial structures, and the one or more second projections comprise a second plurality of radial structures.

15. The system of claim 14, wherein the solids breakup assembly comprises a plurality of balls disposed inside the chamber of the housing.

16. The system of claim 1, comprising a first mixer coupled to a first outlet of the plurality of feedstock outlets and a second mixer coupled to a second outlet of the plurality of feedstock outlets, wherein the first mixer is configured to output a first mixture having a first composition, wherein the second mixer is configured to output a second mixture having a second composition, wherein the first and second compositions differ in a percentage of feedstock, a percentage of water, a percentage of additive, a distribution of sizes of feedstock, or a combination thereof.

17. The system of claim 16, wherein at least one of the first or second mixers is coupled to a feedstock preparation system, a supply of feedstock, a supply of water, a supply of additive, or a combination thereof.

18. A system, comprising:
  a solid feedstock mill, comprising:
    a housing having a cover portion and a body portion disposed about a chamber;
    a solids breakup assembly comprises a plurality of balls disposed inside the chamber, a drive coupled to a rod that extends into the chamber, and a plurality of radial structures coupled to the rod, wherein at least one radial structure of the plurality of radial structures is disposed in the cover portion;
    a feedstock inlet through the body portion into the chamber; and
    a plurality of feedstock outlets through the cover portion from the chamber.

19. The system of claim 18, wherein the plurality of feedstock outlets is disposed above the feedstock inlet, wherein the at least one radial structure is configured to facilitate a discharge through the plurality of feedstock outlets.

20. A method, comprising:
  receiving a feedstock through a feedstock inlet into a chamber of a housing of a solid feedstock mill, wherein the housing comprises a cover portion coupled to a body portion;
  breaking up the feedstock with a solids breakup assembly at least partially disposed inside the chamber, wherein the solids breakup assembly comprises a first rotary structure having one or more first projections disposed in the cover portion, and the solids breakup assembly comprises a second rotary structure having one or more second projections disposed in the body portion; and
  outputting the feedstock from the chamber through a plurality of feedstock outlets in the cover portion of the housing, wherein the plurality of feedstock outlets is disposed above the feedstock inlet, and the one or more first projections of the first rotary structure are configured to facilitate a discharge through the plurality of feedstock outlets.

* * * * *